United States Patent
Pun et al.

(10) Patent No.: US 7,543,867 B2
(45) Date of Patent: Jun. 9, 2009

(54) VACUUM GRIPPING SYSTEM FOR POSITIONING LARGE THIN SUBSTRATES ON A SUPPORT TABLE

(75) Inventors: Digby Pun, San Jose, CA (US); Kent Nguyen, San Jose, CA (US); Robert Barnett, San Jose, CA (US)

(73) Assignee: Photon Dynamics, Inc., San Jose, CA (US)

( * ) Notice: Subject to any disclaimer, the term of this patent is extended or adjusted under 35 U.S.C. 154(b) by 71 days.

(21) Appl. No.: 11/389,556

(22) Filed: Mar. 23, 2006

(65) Prior Publication Data

US 2008/0014075 A1    Jan. 17, 2008

Related U.S. Application Data

(60) Provisional application No. 60/722,769, filed on Sep. 30, 2005.

(51) Int. Cl.
*B66C 1/02* (2006.01)
(52) U.S. Cl. ....................... 294/64.1; 294/64.3
(58) Field of Classification Search ........ 294/64.1–64.3
See application file for complete search history.

(56) References Cited

U.S. PATENT DOCUMENTS

| | | | | |
|---|---|---|---|---|
| 5,261,265 A | * | 11/1993 | Nichols | .................. 72/420 |
| 5,308,132 A | * | 5/1994 | Kirby et al. | ................. 294/64.1 |
| 5,865,487 A | * | 2/1999 | Gore et al. | ..................... 294/2 |
| 6,328,362 B1 | * | 12/2001 | Isogai et al. | ............... 294/64.1 |
| 6,736,408 B2 | | 5/2004 | Olgado et al. | |
| 7,077,019 B2 | | 7/2006 | Weiss et al. | |

FOREIGN PATENT DOCUMENTS

JP    2000-309423 A    11/2000

* cited by examiner

*Primary Examiner*—Paul T Chin
(74) *Attorney, Agent, or Firm*—Townsend and Townsend and Crew LLP (57) ABSTRACT

A vacuum gripper for use in substrate positioning operations includes a vacuum pad adapted to make contact with the substrate and a shaft connected to the vacuum pad. The shaft is characterized by a first diameter at a portion of the shaft proximal to the vacuum pad and a second diameter at a portion of the shaft distal to the vacuum pad. The vacuum gripper also includes a first air bearing surrounding the portion of the shaft proximal to the vacuum pad, a second air bearing surrounding the portion of the shaft distal to the vacuum pad, and an air source in fluid communication with the first air bearing and the second air bearing. The vacuum gripper further includes an exhaust port, a valve in fluid communication with the exhaust port, and a first flow restrictor in fluid communication with the valve.

9 Claims, 9 Drawing Sheets

VACUUM GRIPPING SYSTEM FOR POSITIONING LARGE THIN SUBSTRATES ON A SUPPORT TABLE

CROSS-REFERENCES TO RELATED APPLICATIONS

This application claims priority to U.S. Provisional Application No. 60/722,769, filed Sep. 30, 2005, the disclosure of which is hereby incorporated by reference in its entirety for all purposes.

BACKGROUND OF THE INVENTION

The present invention relates generally to handling of large substrates. More particularly, the present invention relates to a method and apparatus for manipulating glass panels in the Flat Panel Display industry. Merely by way of example, the invention has been applied to gripping, squaring, and indexing glass panels during manufacturing and testing. But it would be recognized that the invention has a much broader range of applicability.

Large thin sheets of glass substrates used in the Flat Panel Display industry are commonly transported by floating on a pressurized air table (with or without preloading the substrate with vacuum) equipped with a matrix of air nozzles. The air cushion between the substrate and air table enables ease of manipulation and protection from damage during manipulation, provided that the air cushion is not compromised during the manipulation process by such effects as vibrations induced into the machine or poor mechanical handling while moving the substrate. Typically, vibrations are minimized by setting the air table within a highly rigid machine structure that includes costly precision parts and devices to minimize vibrations. Automatic mechanical handling of the glass is often achieved using several gripping devices, each of which includes a rigid vacuum pad to hold the substrate while squaring, aligning, indexing and transporting from the glass from one site to another during test. During these manipulations, the glass must remain floating at the nominal very small gap (~200 microns) above the air table. Therefore, the gripping devices, which grab the glass, must also maintain the same nominal gap above the air table surface throughout the entire travel of the manipulation process. Otherwise, the gripper devices could drag the glass down along the air table surface and cause damage to both the glass and machine.

One known conventional gripper pad is mounted on a leaf spring for the required vertical compliance to ensure that the glass substrate remains floating above the air table. However, squaring the substrate requires rotating the substrate slightly, and the conventional gripper pad with leaf spring does not permit a rotational degree of freedom. Thus, use of such a conventional gripper requires handoff of the glass to a rotational cup to perform the squaring/alignment, and then a second handoff back to the leaf spring gripper to perform glass transportation (indexing). One shortcoming of this conventional gripper is that the leaf spring may be too stiff causing the gripper to easily lose grip, and potentially drag the glass along the air table.

Thus, such conventional, non-rotational gripping devices have the drawback of requiring a handoff process during which the glass must be held above the air table while being rotated (squared), and then returned to the gripper for X-Y translations. These several hand-offs can impact the machine cycle time and positional accuracy.

SUMMARY OF THE INVENTION

According to the present invention, techniques related for handling of large substrates are provided. More particularly, the present invention relates to a method and apparatus for manipulating glass panels in the Flat Panel Display industry. Merely by way of example, the invention has been applied to gripping, squaring, and indexing glass panels during manufacturing and testing. But it would be recognized that the invention has a much broader range of applicability.

According to an embodiment of the present invention, a method of manipulating a substrate is provided. The method includes gripping a lower surface of the substrate with a master vacuum gripper mounted on a first motorized stage. The master vacuum gripper is adapted to rotate about a Z-axis. The method also includes gripping the lower surface of the substrate with a slave vacuum gripper mounted on a second motorized stage. The slave vacuum gripper is also adapted to rotate about the Z-axis. The method further includes actuating the second motorized stage in a first direction, thereby causing the slave vacuum gripper to move laterally in both the first direction and a second direction and the master vacuum gripper to rotate about the Z-axis.

According to another embodiment of the present invention, an apparatus for manipulating a position of a substrate is provided. The apparatus includes a support member and a plurality of support bars coupled to the support member and arrayed to form a parallel rank of support bars. The apparatus also includes a first X-Y table coupled to the support member and adapted to translate under motor control in a Y-direction of an X-Y plane and a second X-Y table coupled to the support member and adapted to translate under motor control in both the Y-direction and an X-direction of the X-Y plane. The apparatus further includes a first vacuum gripper coupled to the first X-Y table and controllable in a z-direction. The first vacuum gripper is adapted to rotate about a Z-axis. Moreover, the apparatus includes a second vacuum gripper coupled to the second X-Y table and controllable in the Z-direction. The second vacuum gripper is also adapted to rotate about the Z-axis.

According to an alternative embodiment of the present invention, a vacuum gripper for use in substrate positioning operations is provided. The vacuum gripper includes a vacuum pad adapted to make contact with the substrate and a shaft connected to the vacuum pad. The shaft is characterized by a first diameter at a portion of the shaft proximal to the vacuum pad and a second diameter at a portion of the shaft distal to the vacuum pad. The vacuum gripper also includes a first air bearing surrounding the portion of the shaft proximal to the vacuum pad, a second air bearing surrounding the portion of the shaft distal to the vacuum pad, and an air source in fluid communication with the first air bearing and the second air bearing. The vacuum gripper further includes an exhaust port in fluid communication with the first air bearing and the second air bearing, a valve in fluid communication with the exhaust port, and a first flow restrictor in fluid communication with the valve.

According to another alternative embodiment of the present invention, a method of translating a vacuum gripper adapted for use in substrate positioning operations is provided. The vacuum gripper includes a vacuum pad adapted to make contact with a substrate and a shaft connected to the vacuum pad. The method includes receiving a gas at a first input port in fluid communication with a first air bearing surrounding a portion of the shaft proximal to the vacuum pad and receiving the gas at a second input port in fluid communication with a second air bearing surrounding a portion of the shaft distal to the vacuum pad. The method also includes internally exhausting the gas through the first air bearing and the second air bearing into a plenum formed between the first air bearing and the second air bearing and externally exhausting the gas through an outlet port in fluid communication with the plenum. The method further includes actuating a valve to establish a differential pressure in the plenum and thereby translate the vacuum gripper.

Numerous benefits are achieved using the present invention over conventional techniques. For example, in an embodiment according to the present invention, a gripping device utilizing a constant force pneumatic device and air bearing system is provided that includes a passive vacuum pad that can follow the gap height variation of the substrate on the air table. Additionally, the vacuum pad can rotate. In some embodiments utilizing a pair of these gripping devices, systems are provided with the capability to grab a glass substrate and position it laterally and rotationally. The capability enables a system operator to perform squaring, alignment, other positional manipulations of the substrate, and the like, without release and re-grip. Accordingly, embodiments of the present invention utilized in pair eliminate rigid and costly machine structures as well as complex, precise alignment processes. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

DETAILED DESCRIPTION OF SPECIFIC EMBODIMENTS

According to the present invention, techniques related to the handling of large substrates are provided. More particularly, the present invention relates to a method and apparatus for manipulating glass panels in the Flat Panel Display industry. Merely by way of example, the invention has been applied to gripping, squaring, and indexing glass panels during manufacturing and testing. But it would be recognized that the invention has a much broader range of applicability.

Figure 9A:
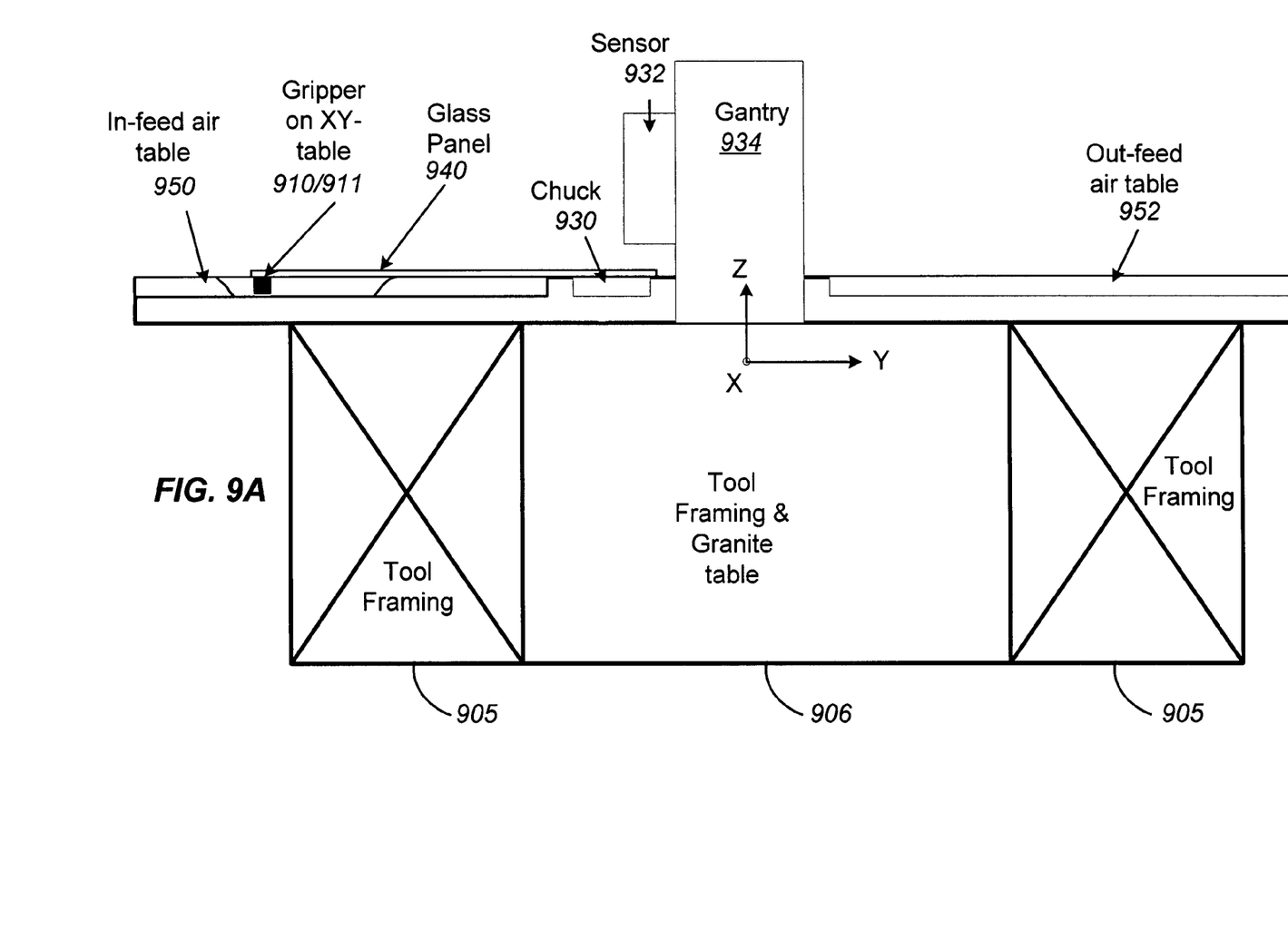
FIG. 9A is a simplified schematic cross-sectional illustration of a substrate positioning system according to an embodiment of the present invention.
Figure 9B:
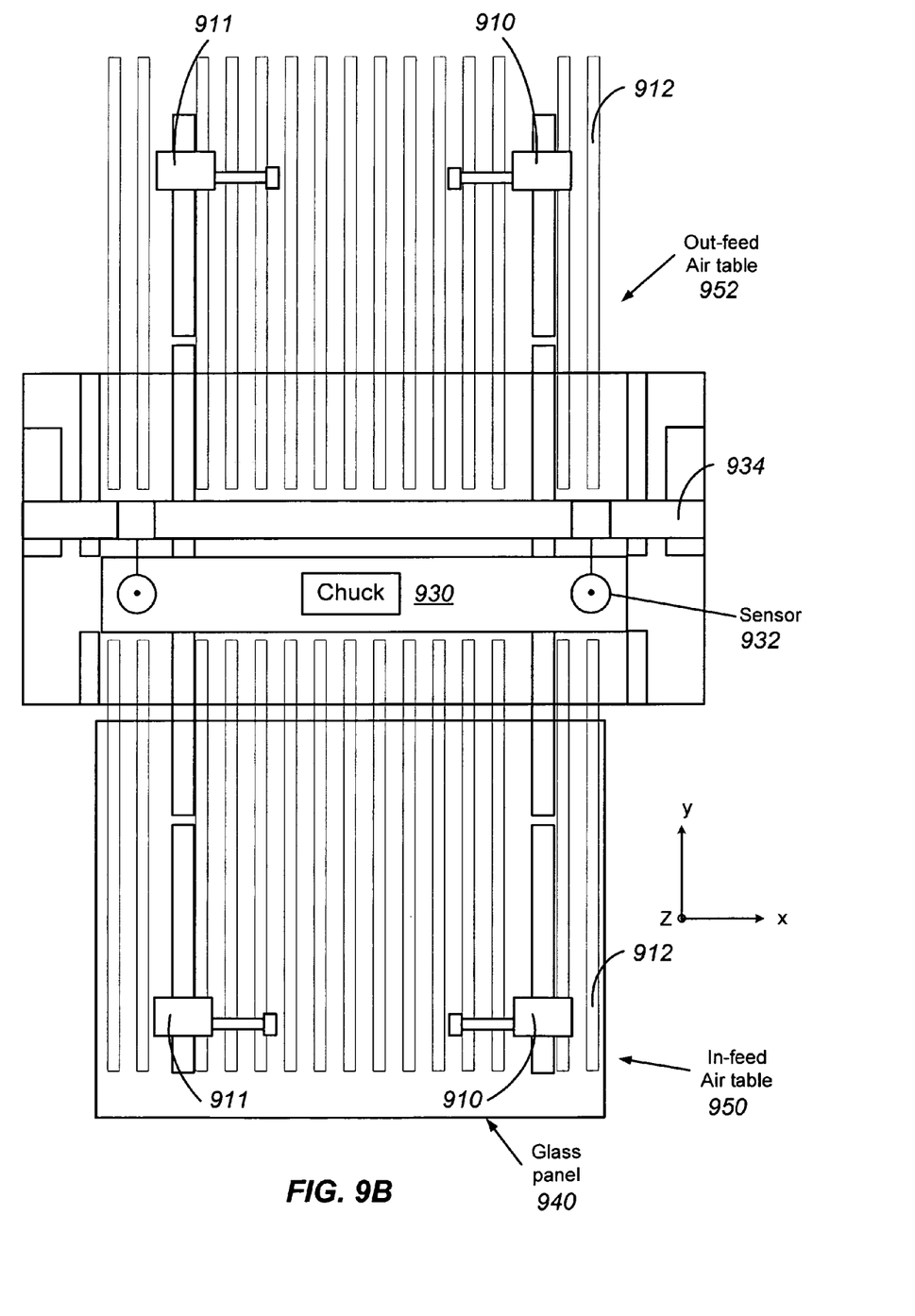
FIG. 9B is a simplified schematic top-view illustration of a substrate positioning system according to an embodiment of the present invention.

FIGS. 9A and 9B are simplified schematic cross-sectional and top-view illustrations, respectively, of a substrate positioning system according to an embodiment of the present invention. Referring to FIGS. 9A and 9B, tool framing 905 integrated with a granite table 906, is adapted to provide mechanical support for several components of the substrate positioning system, which is used in inspection and/or repair operations in some embodiments. A number of rails 912 are mounted in parallel ranks on the tool framing 905 and granite table 906 to form an in-feed air table 950 and an out-feed air table 952. In a typical operation, a glass panel 940 is loaded onto the in-feed air table 950, processed using the sensors 932 mounted on gantry 934, and unloaded onto the out-feed air table 952. As shown in FIGS. 9A and 9B, a glass panel 940 is positioned on the in-feed air table 950.

As illustrated in FIG. 9B, the periodicity of the support bars or rails 912 making up the in-feed air table 950 and the out-feed air table 952 is generally uniform, while providing a space for a number of master vacuum gripping devices 910 and a number of slave gripping devices 911. A first set of vacuum gripping devices (grippers) lie within the in-feed air table and another set lie within the out-feed air table. In embodiments of the present invention, the master gripping devices 910 and slave gripping devices 911 are adapted to pass between adjacent rails 912 in the Z-direction and make contact with a glass panel 940 resting on either the in-feed air table 950 or the out-feed table 952. The master and slave gripper devices are also adapted to translate in the X-direction and the Y-direction.

During operation, the grippers, which support the glass panel, move in the Y-direction over the chuck bar or rails in steps while the sensor/detector passes back and forth in the X-direction. The grippers on the out-feed table grab onto the glass and take control of the movement from the in-feed grippers once the glass is about half-way through. Utilizing these gripping devices, glass panels are aligned, squared, and indexed as described more fully throughout the present specification.

Figure 1:
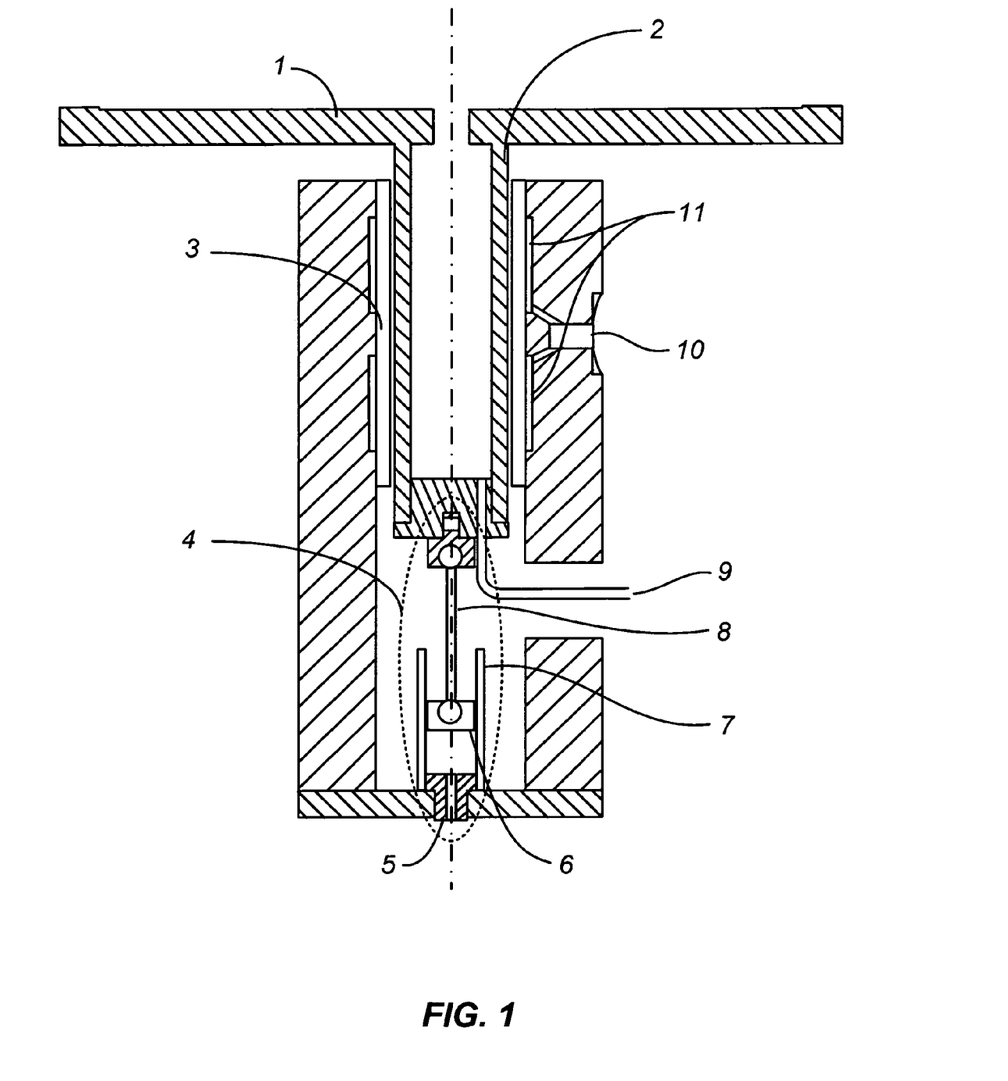
FIG. 1 is a cross-sectional view of a vacuum gripping device according to an embodiment of the present invention.

FIG. 1 is a cross-sectional view of a vacuum gripping device according to an embodiment of the present invention. Referring to FIG. 1, the vacuum gripping device includes a vacuum pad (1) connected to a hollow shaft (2), which is tightly held by a porous air bearing (3). Compressed air is fed through the inlet port (10) and distributed to chambers (11). The air moves through the porous structure of bearing (3) and eventually reaches the shaft (2), thereby providing a stiff air-bearing support. The pad and shaft assembly can rotate about the bearing and transverse vertically. The vertical motion of the pad is controlled by the pneumatic actuator (4) which includes, in part, a low friction graphite piston (6) riding inside a smooth glass tube (7). When pressurized by air through inlet hole (5), air will propel the piston up. The outer diameter of the piston and the inner diameter of the glass bore are sized to allow the pressurized gas to escape and form an air-bearing surface for minimizing friction between the piston and the bore. The connecting rod (8) between the piston and the shaft (2) is ball-jointed at both ends to minimize any binding effects due to misalignment between the actuator (4) and the air bearing (3). With these arrangements, the vacuum pad is able to achieve a very smooth vertical motion, and the up-lifting force can be precisely controlled by the pressure delivered to the actuator. The vacuum to the pad is introduced through the inlet tube (9).

Figure 2:
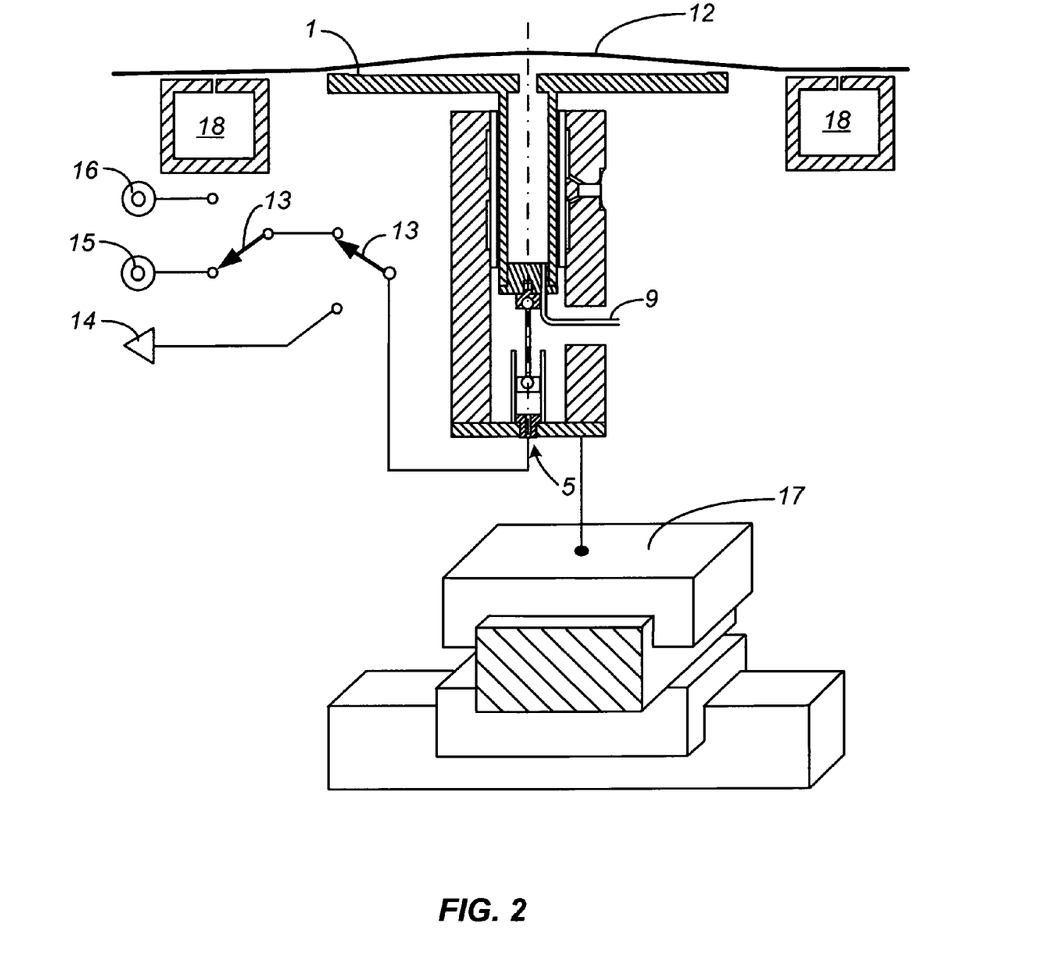
FIG. 2 is a schematic block diagram illustrating pneumatic control of a vacuum gripping device such as that illustrated in FIG. 1.

FIG. 2 is a schematic block diagram illustrating pneumatic control of a vacuum gripping device such as that illustrated in FIG. 1. The vacuum pad (1) when moved up and engaged with glass (12) for a vacuum seal utilizes a slightly higher force to overcome the glass sagging, and tents up the glass slightly (dome shape) around the edge of the vacuum pad prior to drawing vacuum so as to initiate a vacuum seal. Typically, the rim of the vacuum pad is slightly raised to facilitate a better vacuum seal.

Once the vacuum pad is engaged with the glass substrate, the pressure inside the actuator will be reduced slightly to counter balance the weight of the pad and shaft assembly. Two electrical solenoids (13) are connected in series to provide three pressure settings to inlet port (5), namely: vent (14) for bleeding out the pressure to atmosphere and letting the vacuum pad disengage and drop; high pressure (16) for driving the pad up and ensuring that the pad can engage and establish a vacuum seal; and a slightly lower pressure (15), which counterbalances the weight of the pad and is the setting used during substrate manipulations. This "manipulate" setting (15) drops the height of the pad to ensure the pad will not exert excessive force on the thin substrate and disturb its flatness while manipulating it on the air table. The "manipulate" setting is adjusted to provide suitable stiffness, while also floating up and down to follow the level of the glass. The glass substrate is held tightly in the lateral direction by the stiff air bearing.

Referring to FIG. 2, a process for gripping using a vacuum gripping device such as that illustrated in FIG. 1 is described as follows. The solenoids (13) are set to the "down" setting (14). Vacuum is applied via the vacuum port (9). When ready to engage the vacuum pad, the solenoids are switched to the "full up and grip" setting (16) and air is introduced to the inlet port (5). The pad moves up and engages and seals against the glass substrate. Air pressure of approximately 25 psi may be typically used to just lift the glass substrate to enable engagement and sealing. When the glass is gripped and ready to be maneuvered, the solenoids 13 are switched to the "manipulate" position (15).

The process for releasing using the first embodiment device is as follows. The air flow solenoids (13) are switched from the "full up" (16) to the "down" (14) setting. The vacuum in the pad is switched to vent. Accordingly, the pad disengages from the glass substrate. The vacuum gripping device is mounted on an X-Y actuator stage 17 as illustrated in FIG. 2. Additional description of these X-Y actuator stages, operating in a master/slave relationship, are described more fully below. In an embodiment, the master gripper is motorized in both the X-direction and the Y-direction and the slave gripper is motorized in a single direction, for example, the Y-direction.

Figure 3:
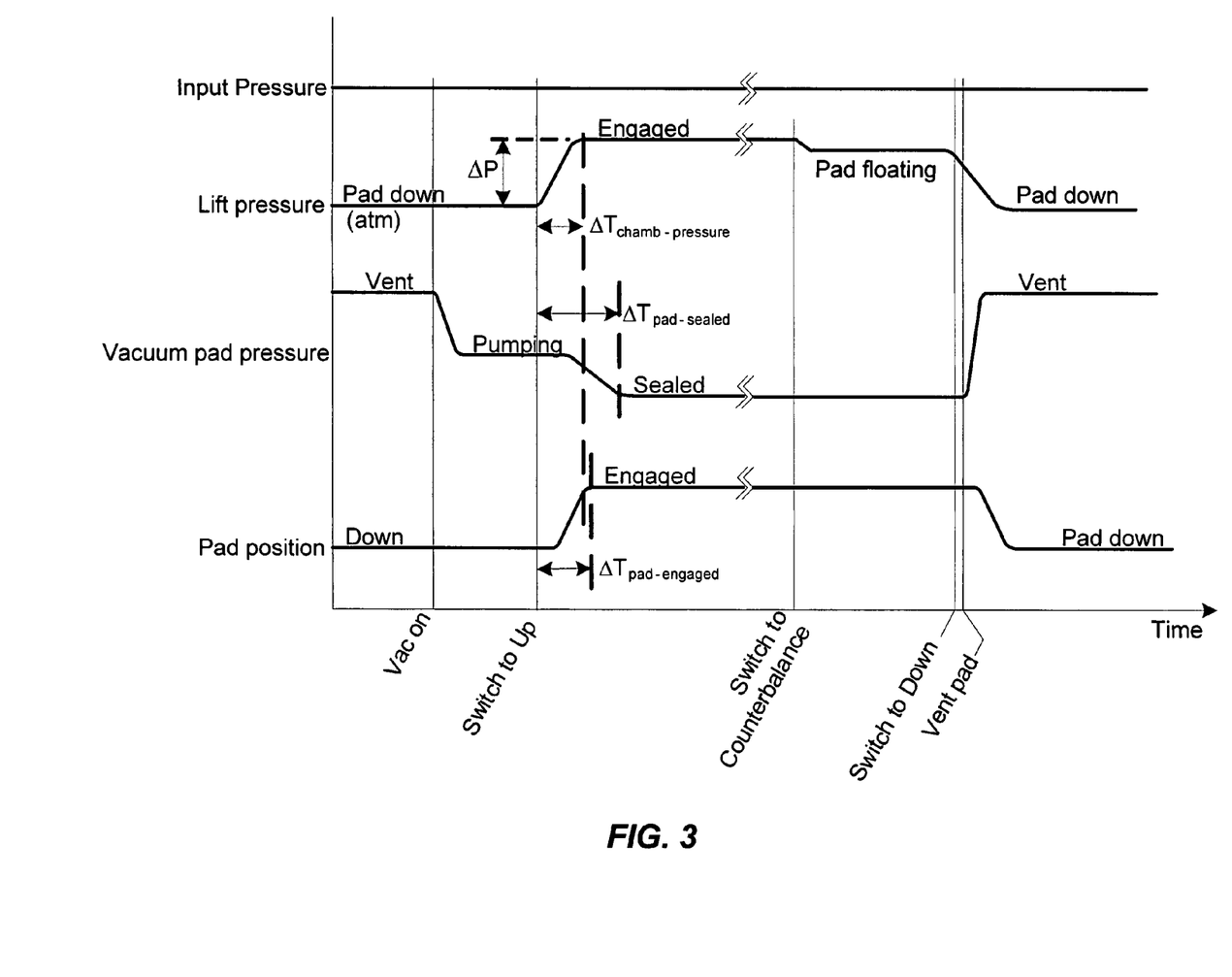
FIG. 3 is a timing diagram for gripping and releasing a substrate using a vacuum gripping device such as that illustrated in FIG. 1.

FIG. 3 is a timing diagram for gripping and releasing a substrate using a vacuum gripping device such as that illustrated in FIG. 1. The x-axis is time. The y-axis includes several key parameters of interest: the input pressure, the lift pressure, the vacuum pad pressure, and the pad position. The curves for each of the parameters are intended to show changes in each parameter relative to time, but not necessarily relative to the magnitudes of each of the parameters. The sequence of events is similar to that described above. Vacuum is first applied to the vacuum port of the pad. However, since the pad is not yet sealed, the vacuum pressure is only slight ("Pumping"). When the air solenoid is switched to "pad up," the pad moves up and engages the glass substrate. The diagram shows a slight delay between full engagement and achieving full vacuum pressure. For some embodiments of the gripping device, ΔP, the change in the lift pressure, ranges from atmosphere to approximately 25 psi, and the time for full engagement with full vacuum is approximately 1 to 2 seconds.

Figure 4:
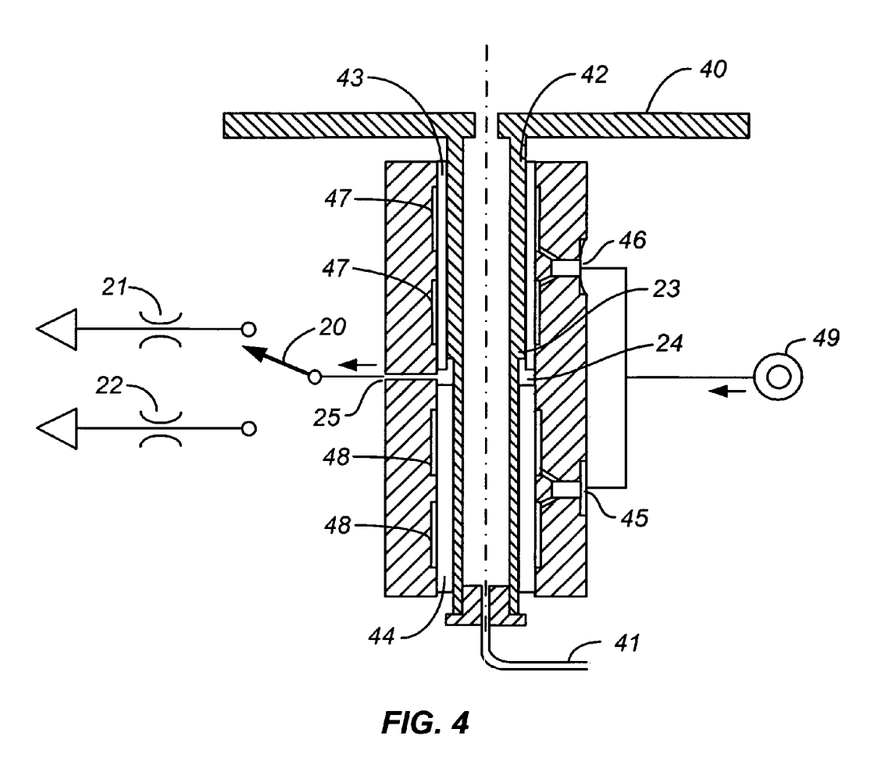
FIG. 4 is a cross-sectional view of a vacuum gripping device according to another embodiment of the present invention.

FIG. 4 is a cross-sectional view of a vacuum gripping device according to another embodiment of the invention. The embodiment illustrated in FIG. 4, like the embodiment illustrated in FIG. 1, includes a vacuum pad (40) with a hollowed out shaft (42) that is supported by a cylindrical air-bearing (43). As in the embodiment illustrated in FIG. 1, the inner volume of the shaft is connected to a vacuum pump (41), and the vacuum pad includes a slightly raised perimeter to improve the gripping contact to the panel.

As illustrated in FIG. 4, the shaft diameter is stepped at about half of its length. The upper portion of the shaft has a larger diameter than the lower portion. Each portion of the shaft length is supported by a cylindrical air-bearing (43, 44), which also have different diameters. The area of the annulus (23) (also referred to as a step or shoulder) formed by the difference in upper and lower diameters is sized to enable an upward thrust of the shaft and connected vacuum pad when high air pressure is permitted to build up within chamber volume (24).

A high pressure source (49) supplies air to inlet ports (45) and (46). The air is distributed to chambers (47 and 48, respectively), passes through the porous structure of each of the two bearings (43, 44), and establishes a high pressure air bearing between the porous bearing inner diameters and the shaft diameters of the vacuum pad (42). These two cylindrical air-bearings allow smooth but stiff rotational motion of the shaft. The air exhausts from the bearing shaft interface out the ends of the bearings and also into chamber volume (24). The chamber volume (24) is further exhausted through a hole (25) that leads to solenoid valve (20) that may switch between either of two paths, one path having restrictor, or orifice (21), which is sized to allow pressure in chamber volume (24) to match the weight of the shaft and vacuum pad, and the second path having restrictor, or orifice (22), which is sized to allow air pressure to build in chamber volume (24) to thrust the shaft and vacuum pad upward. In an embodiment, the first restrictor (21) is larger in size than the second restrictor (22).

In practice, input connections such as the vacuum port in FIG. 1 or FIG. 4 may be attached to the vacuum pad/shaft, which rotates within the gripping device's housing during the glass substrate panel squaring process. Such connections may be designed to allow a relatively modest range of rotational motion (approximately 10 degrees), but may bind or constrain motion at larger rotations. In general, applications utilizing embodiments of the present invention include requirements for squaring of plates that is less than 5 degrees. A spring device may be included to return the shaft to the rotational origin when in the released (ungripped) state.

Figure 5:
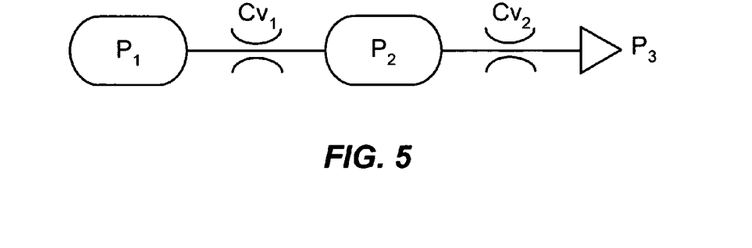
FIG. 5 is a schematic block diagram illustrating pneumatic control of a vacuum gripping device such as that illustrated in FIG. 4.

Pneumatically, the arrangement in FIG. 4 can be simplified to a block diagram as shown in FIG. 5, where:

$P_1$ is the input pressure (49).

$P_2$ is the desired pressure at chamber volume (24)

$P_3$ is the exit pressure=atmospheric pressure $C_{v1}$ is the combined flow coefficient of the air bearing (43 & 44)

$C_{v2}$ is the flow coefficient of the restrictor (21 or 22)

At the choke flow condition, Mach number>1, the flow coefficient $C_{v2}$ is determined by the following derived formula: $C_{v2} = C_{v1}(P_1/P_2)^{3/2}$.

In the embodiment illustrated in FIG. 4, Z-motion (i.e., along the length of the shaft) of the vacuum pad depends on a controlled small change in backing or lift pressure, rather than the full bleeding to atmosphere found in the embodiment illustrated in FIG. 1. That is, the restrictor 21 establishes a minimum backing pressure in chamber volume 24 while restrictor 22 increases the backing pressure slightly by ΔP. Switching between restrictor 21 and restrictor 22 thus can provide rapid fixed and repeatable change in z-position of the vacuum pad, assuming a minimum input pressure is available.

Specifically, by sizing the restrictors (orifices) and the chamber volume 24 properly, the desired upward motion of the vacuum pad can be achieved once a minimum backing pressure is achieved in chamber volume 24. Further, the backing pressure in chamber volume 24 can be maintained for a reasonable range of input pressures because the ends of the bearings provide a leakage path for overpressure conditions. Both the orifices and the bearing ends offer fixed sized leakage paths. Thus, a reproducible upward motion of the vacuum pad can be achieved over a reasonable range of input conditions.

Because backing pressure remains established in chamber volume 24, the size of the total volume, which realistically includes volume in the connections between the chamber 24 and the restrictors 21 and 22, can vary slightly from tool-to-tool without significant differences in tool-to-tool performance and without significant tuning or calibrations to ensure performance equivalency.

Ideally, the total volume of the chamber, including the extensions, should be kept as small as possible, for example by placing the solenoid 20 directly outside hole 25, and placing the restrictors 21, 22 as near to the solenoid 20 as possible. This minimizes tool-to-tool variations and need for significant tuning or calibrations, but also allows for fastest time to re-establish backing pressure, and hence, allows fastest response time of the vacuum pad position to the solenoid switching.

Proper selection of the restrictors in the second embodiment may allow systems in which the number of gripper pad positions are reduced to "up" (22) and "down" (21), unlike the first embodiment which has a third state. The use of restrictors as noted above reduces the sensitivity to variations in the input pressure. This means that the "up" restrictor may be selected to result in a Z-motion that ensures sealing of the pad to the glass, but remains suitably compliant during manipulations.

A process for gripping using a vacuum gripping device such as that illustrated in FIG. 4 is described as follows. High pressure air (49) is already flowing into the gripping device at inlets 45 and 46. The solenoid is switched to restrictor 21 (the "down" state). After the introduction of the glass substrate, the vacuum is turned on and applied to the vacuum pad shaft (40). The solenoid is switched to restrictor 22 (the "up" state), which restricts flow further and forces pressure buildup in chamber volume or plenum 24. The increase in chamber pressure puts force on the shaft shoulder (23) and the shaft/vacuum pad moves upward toward the glass. Thus, embodiments of the present invention utilize the flow restrictors 21 and 22, along with other system components, to generate a differential pressure in plenum 24 that is effective to translate the shaft along the longitudinal axis of the shaft. The vacuum pad rim engages with the glass substrate and tents up the glass slightly (dome shape) around the edge of the vacuum pad to form the vacuum seal. A vacuum sensor measures the vacuum pressure. Because the glass substrate floats on the air table during the gripping process, inadvertent excess Z-axis movement of the gripper beyond the height of the air table top surface will only result in the lifting of the glass substrate. The only downward force on the glass substrate is its own weight.

The process of releasing grip is as follows: The gripper solenoid is switched to restrictor 21 (the "down" state), which is a larger orifice than restrictor 22 and thus releases the chamber pressure that is holding up the shaft/vacuum pad. The gripper shaft/vacuum pad drops under its own weight. A mechanical sensor detects when the shaft has dropped. At approximately the same time, the vacuum solenoid switches from vacuum pumping to vent, thereby ensuring separation between the vacuum pad and glass substrate.

For an input pressure of 70 psi, typical restrictor sizes may be 0.01 to 0.03 inches in diameter, and an upward thrust distance may be 0.25 to 0.5 inches. The pressure in chamber volume 24 is typically 70 psi. Currently, with proper sizing of the flow orifice using the formula above, this arrangement can cycle the vacuum pad at approximately 6 Hz.

Figure 6:
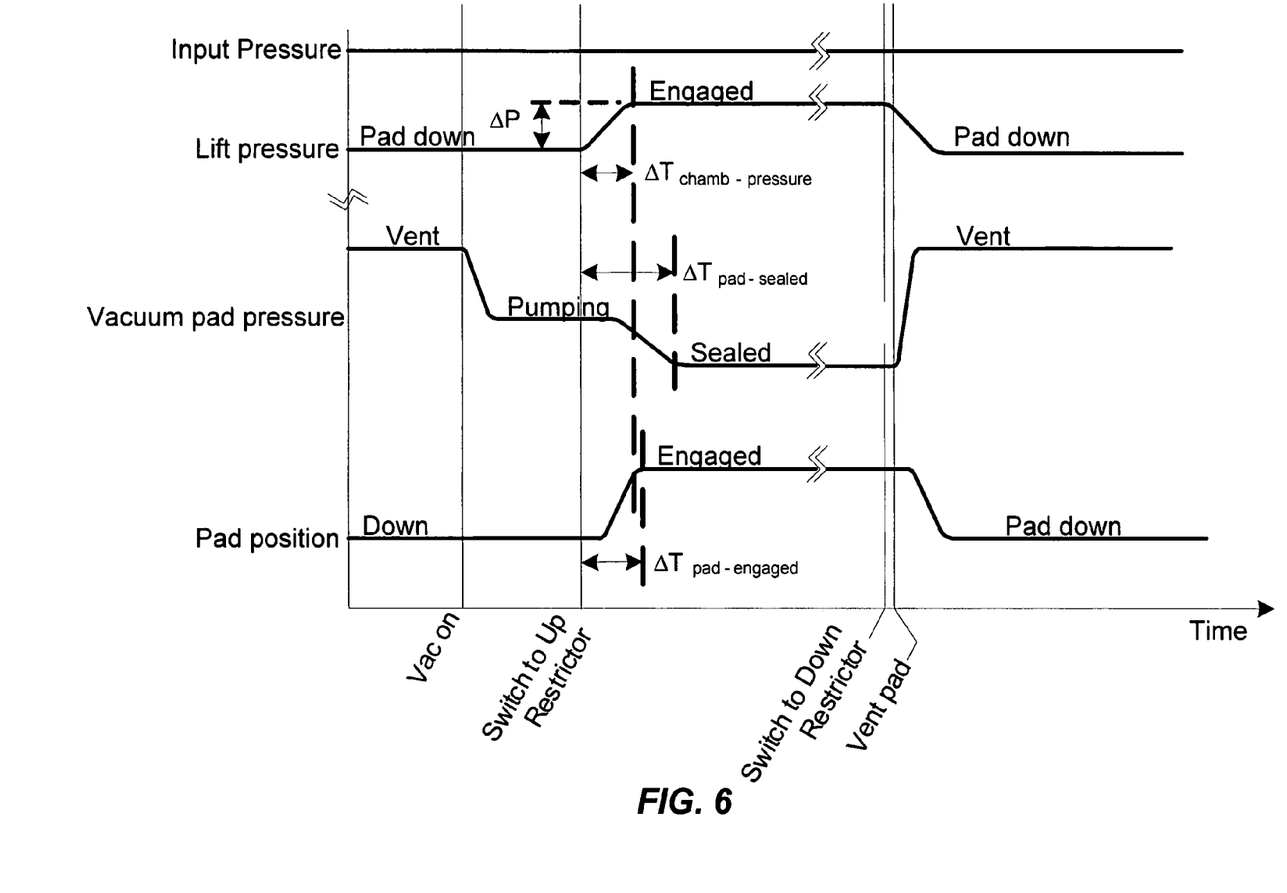
FIG. 6 is a timing diagram for gripping and releasing a substrate using a vacuum gripping device such as that illustrated in FIG. 4.

FIG. 6 is a timing diagram for gripping and releasing a substrate using the vacuum gripping device illustrated in FIG. 4. The x-axis is time. The y-axis includes several key parameters of interest: the input pressure, the lift pressure, the vacuum pad pressure and the pad position. The curves for each of the parameters are intended to show changes in each parameter relative to time, but not necessarily relative to the magnitudes of each of the parameters. The sequence of events is similar to that described above. Vacuum is first applied to the vacuum port of the pad. However, since the pad is not yet sealed, the vacuum pressure is only slight ("Pumping"). When the air solenoid is switched to "pad up," the pad moves up and engages the glass substrate. The diagram shows a slight delay between full engagement and achieving full vacuum pressure. For the second embodiment of the gripping device, ΔP, the change in the lift pressure, is far smaller than that of the first embodiment (a few psi), and time for full engagement with full vacuum is less than 1 second.

Referring to FIGS. 9A and 9B, systems provided according to embodiments of the present invention, utilize a number of air tables that are constructed with support bars or rails 912 (see extrusion bars (18) in FIG. 2), generally spaced at an even periodicity under the substrate. Rows of air nozzles can be machined on the rails (extrusion bars) to float the substrate up in response to appropriate air pressure from inside the extrusion. Alternatively, the interior extrusion may be evacuated, thus pulling and holding the substrate against the extrusion bars (known as "chucking"). The extrusion bars may be made of relatively inexpensive materials such as aluminum, or may be made of glass, which provide the advantage of transparency to enable backlighting of the glass substrate.

A pair of gripping devices are located between the extrusion bars toward the trailing end and near the side edges of the plate. The gripping devices may be approximately 1.5 m apart, for the case of a 2 m wide plate. In a specific embodiment, the gripping devices constitute an identical pair. The plane of the vacuum pads of the gripping devices is in the same plane as the extrusions bars. Each gripping device is placed on an identical X-Y table as shown in FIGS. 7A-7F. Total motion in the X-direction is typically less than one inch. Total motion in the Y-direction is the length of travel of the glass plate through the machine, typically 2 meters. The X-Y table supporting the gripping device may be air bearing or mechanical bearing.

The gripping devices enable the manipulation of the substrate to square, align and index, and transport from one site to another during testing or inspection. Typically, a robot introduces the glass plate to the tool and places it lifters that lie between the extrusion bars of the air table. Air is turned on, and the lifters lower the glass onto the grippers. The grippers then square the glass and move it forward for final alignment. Then the grippers move the glass to the first test position. The substrate is chucked to the table, and the substrate is tested with the X-scan sensor. The glass is then floated (vacuum removed, gas introduced) and then moved a fixed amount in the Y-direction by the gripper to the next test location (this is known as "indexing"). The glass is then chucked down and tested. When testing is complete, the glass is floated, the grippers exchange control of the glass with feed grippers, which move the glass over feed lifters at the exit end of the tool. The lifters take control of the glass from the feed grippers. The glass is lifted to enable the robot to remove it from the tool.

Robot placement error, among other factors, sets the specification for squaring and aligning the glass plate by the gripping devices. Typical robot placement errors may be 0.5 to 2.0 degrees, depending on size of the glass substrate and robot type. Thus, the gripping devices of the tool must be designed to manipulate the glass plate accurately and within approximately 2.0 degrees.

FIGS. 7A-7F illustrate a sequence of manipulation operations of a substrate according to an embodiment of the present invention. As described above, a pair of gripping devices (70 and 80) are utilized in squaring and indexing operations. Squaring operations are illustrated by the operations shown in FIGS. 7A-7C and indexing operations are illustrated by the operations shown in FIGS. 7D-7F. A first gripper device (70) acts as a master device and a second gripper device (80) acts a slave device. The master device (70) includes a motor controlled X-actuator (72) and a motor controlled Y-actuator (73). Utilizing the motor controlled X-actuator and the motor controlled Y-actuator, the master device is adapted to move under motor control in the X-Y plane.

The slave device (80) includes a motor controlled Y-actuator (83). The X-actuator (82) of the slave device (80) includes a sliding mechanism with a spring centering device to return the sliding mechanism back to the center of travel upon un-gripping the substrate. In other embodiments, other flexible couplers are utilized to provide a sliding and centering mechanism. Thus, as described in relation to the squaring operation (FIGS. 7A-7C), motor control of the slave device in the Y-direction generally results in motion of the X-actuator in response to the Y-direction motion. In an embodiment, the slave device is operable to move under motor control in the X-direction and slide in the Y-direction. One of ordinary skill in the art would recognize many variations, modifications, and alternatives.

Figure 7A:
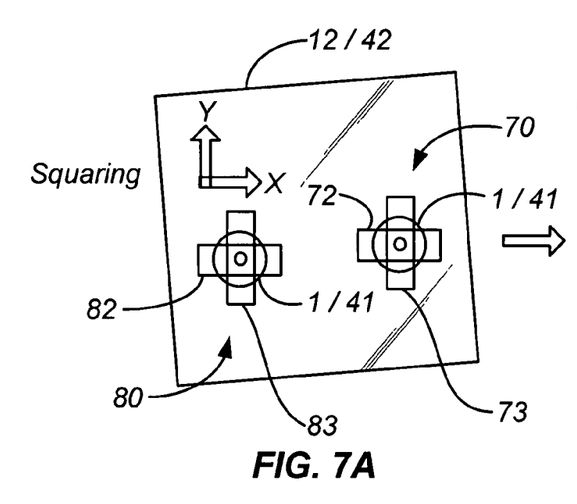
FIG. 7 illustrates a sequence of manipulation operations of a substrate according to an embodiment of the present invention.
Figure 7B:
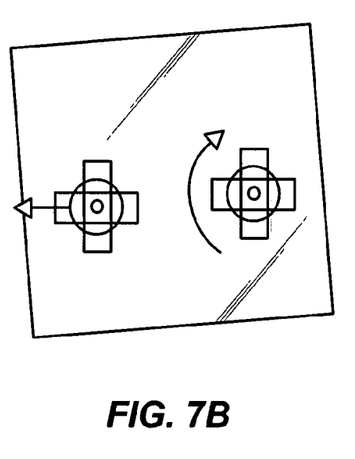
Figure 7C:
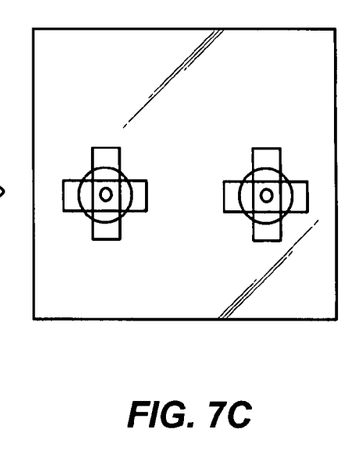
Figure 7D:
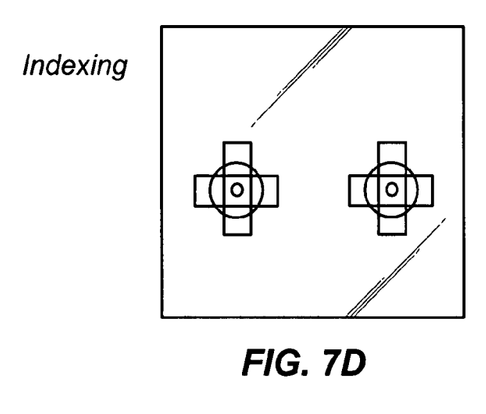

As illustrated in FIGS. 7A-7C, a process used to square the plate is performed as follows. Both grippers hold the plate as illustrated in FIG. 7A. The design of the grippers allows rotational motion about the center of rotation of each gripper. The X-Y position of the master gripper (70) is held in a fixed position. The slave gripper (80) moves in the Y-direction under motor control to result in rotation of the plate about the master gripper's center of rotation as shown in FIG. 7B. Because the slave gripper (80) includes a spring-loaded sliding mechanism as an X-actuator, the slave gripper is free to move as needed in the X-direction as illustrated in FIG. 7B. During motion, the slave gripper is constrained by the position of the master gripper and the slave gripper Y-direction control. Once squaring is achieved as shown in FIG. 7C, control of the slave gripper is synchronized with the master.

Figure 7E:
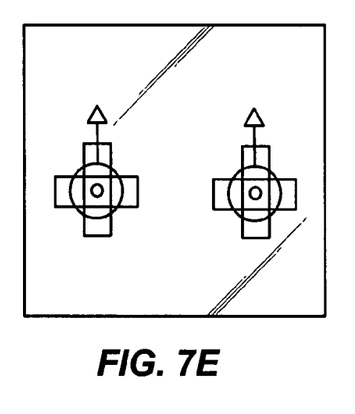
Figure 7F:
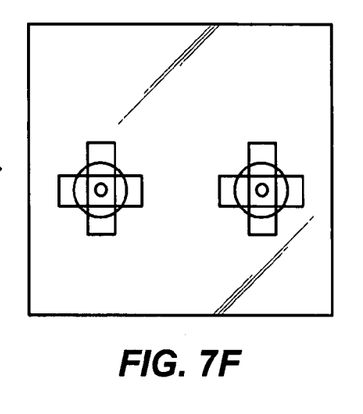

With the glass squared, both grippers can move together to index the glass substrate in the Y-direction (controlled by the synchronization of the two Y-direction motion controls as shown in FIG. 7E), or move together sideways in the X-direction (controlled by the X-actuator of the master gripper alone). The total range of motion in the X-direction is small, and the X spring constraint on the slave gripper is designed to allow the full range of X-direction motion. The combination of this sequence of squaring first, the master-slave arrangement, and the rotational degree-of-freedom provided about the gripper axes eliminate the need for releasing and re-gripping the substrate during the alignment process.

Systems provided according to embodiments of the present invention, as described herein, eliminates rigid and costly machine structures as well as and complex and precise alignment processes. Utilizing a pair of gripping devices including rotational pads, as described herein, operations are performed to manipulate the substrate for squaring and aligning without release and re-grip. The gripping force is programmable to enhance sealing for the initial vacuum engagement. The lifting force is also programmable to counter balance the sagging of the thin substrate to further reduce the chance of touch down and dragging on the air table. Furthermore, round vacuum pads with a slight raised feature at the perimeter increase gripping force by as much as 25%. In alternative embodiments, the gripping forces increased by more or less than 25%.

Figure 8:
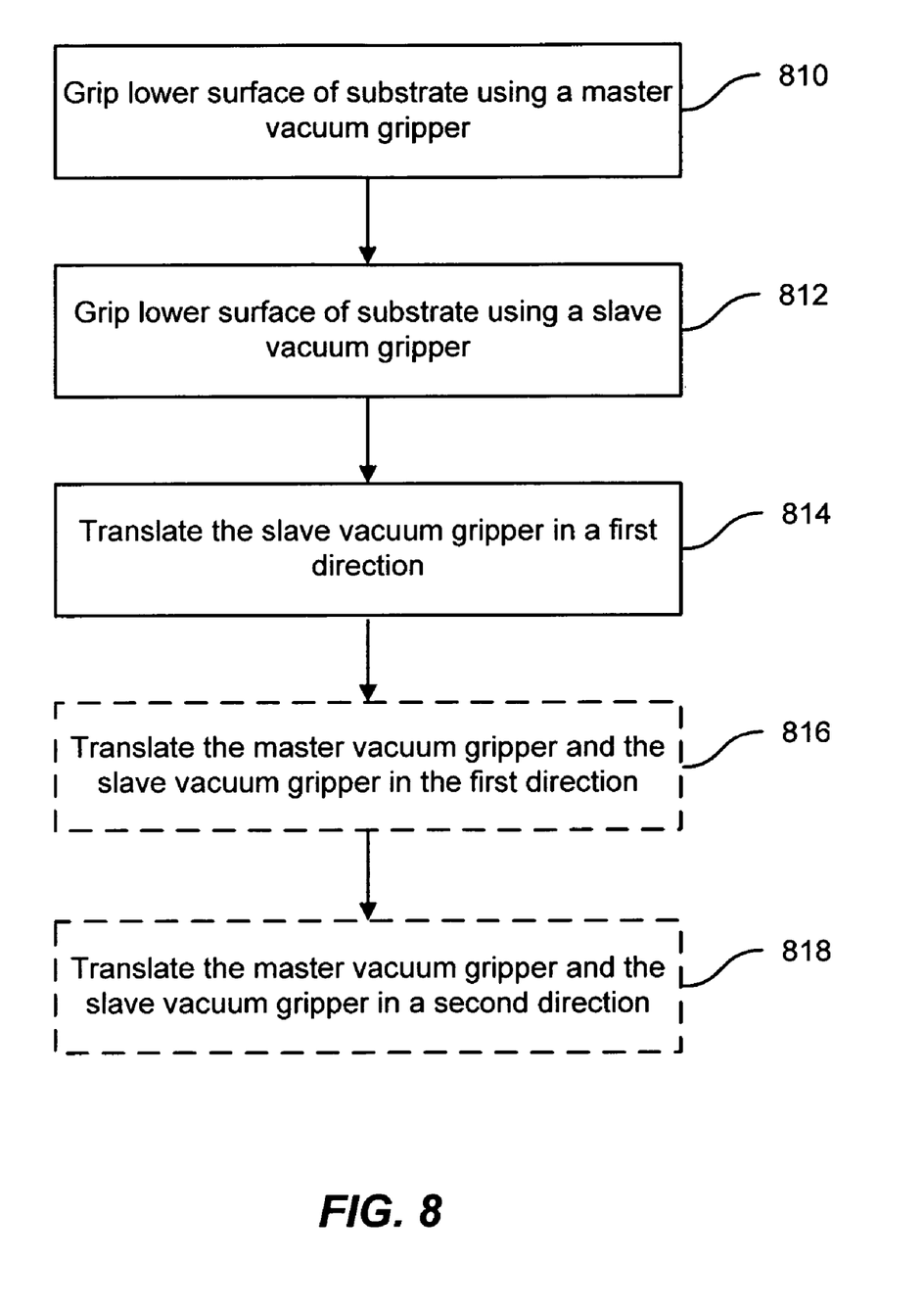
FIG. 8 is a simplified flowchart illustrating a method of manipulating a substrate according to an embodiment of the present invention.

FIG. 8 is a simplified flowchart illustrating a method of manipulating a glass substrate according to an embodiment of the present invention. The lower surface of the substrate is gripped using a master vacuum gripper mounted on a motorized X-Y stage (810). In embodiments of the present invention, the master vacuum gripper is adapted to rotate about a Z-axis. Motor control is provided to translate the master vacuum gripper in the X-direction and the Y-direction. The lower surface of the substrate is gripped with a slave vacuum gripper mounted on a partially motorized X-Y stage (812). The slave vacuum gripper is also adapted to rotate about the Z-axis.

In a squaring operation, the slave gripper is actuated to move in the Y-direction (814), thereby causing the slave vacuum gripper to move laterally in both an X-direction and the Y-direction and the master vacuum gripper to rotate about the Z-axis. In a first indexing operation, the slave gripper is actuated in the Y-direction and the master gripper is also actuated in the Y-direction (816). In a second indexing operation, the master gripper is actuated in the X-direction and the slave gripper moves in the X-direction in response to the motion of the master gripper (818).

It should be appreciated that the specific steps illustrated in FIG. 8 provide a particular method of manipulating a glass substrate according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A vacuum gripper for use in substrate positioning operations, the vacuum gripper comprising:
   a vacuum pad adapted to make contact with a lower surface of a substrate;
   a shaft connected to the vacuum pad, wherein the shaft is characterized by a first diameter at a portion of the shaft proximal to the vacuum pad and a second diameter at a portion of the shaft distal to the vacuum pad;
   a first air bearing surrounding the portion of the shaft proximal to the vacuum pad;
   a second air bearing surrounding the portion of the shaft distal to the vacuum pad;
   an air source in fluid communication with the first air bearing and the second air bearing;
   an exhaust port in fluid communication with the first air bearing and the second air bearing;
   a valve in fluid communication with the exhaust port; and
   a first flow restrictor in fluid communication with the valve.

2. The vacuum gripper of claim 1 further comprising a second flow restrictor in fluid communication with the valve, wherein the valve is adapted to place either the first flow restrictor or the second flow restrictor in fluid communication with the exhaust port.

3. The vacuum gripper of claim 2 wherein an orifice of the first flow restrictor is characterized by a diameter of different size than an orifice of the second flow restrictor.

4. The vacuum gripper of claim 1 wherein the valve is a solenoid valve.

5. The vacuum gripper of claim 1 wherein the first air bearing is a cylindrical bearing.

6. The vacuum gripper of claim 1 wherein the second air bearing is a cylindrical bearing.

7. The vacuum gripper of claim 1 wherein the first air bearing and the second air bearing comprise a porous material.

8. The vacuum gripper of claim 1 wherein the first diameter is greater than the second diameter.

9. The vacuum gripper of claim 1 wherein the air source in fluid communication with the first air bearing and the second air bearing comprises a positive pressure air source.

* * * * *